(12) United States Patent
Eom

(10) Patent No.: US 8,749,462 B2
(45) Date of Patent: Jun. 10, 2014

(54) DC-DC CONVERTER AND ORGANIC LIGHT EMITTING DISPLAY USING THE SAME

(75) Inventor: Ki-Myeong Eom, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 685 days.

(21) Appl. No.: 12/217,817

(22) Filed: Jul. 8, 2008

(65) Prior Publication Data

US 2009/0058311 A1 Mar. 5, 2009

(30) Foreign Application Priority Data

Aug. 28, 2007 (KR) ........................ 10-2007-0086511

(51) Int. Cl.
*G09G 3/34* (2006.01)
(52) U.S. Cl.
USPC ............. 345/84; 345/102; 345/211; 345/212; 345/204
(58) Field of Classification Search
CPC ....................................................... G09G 3/34
USPC ............. 315/172, 173, 169.3, 247, 291, 307, 315/224, 185 S, 312–326; 363/15, 16, 17; 345/80, 76–78, 82, 90, 92, 102, 204, 345/211–214
See application file for complete search history.

(56) References Cited

U.S. PATENT DOCUMENTS

| 4,422,073 | A * | 12/1983 | Winner .................. 340/870.21 |
| 7,593,241 | B2 * | 9/2009 | Kwon et al. .................. 363/16 |
| 2002/0158587 | A1 * | 10/2002 | Komiya ..................... 315/169.3 |
| 2003/0184538 | A1 * | 10/2003 | Yamato et al. ................. 345/211 |
| 2005/0104529 | A1 * | 5/2005 | Park et al. ................... 315/169.3 |
| 2006/0181904 | A1 | 8/2006 | Lee et al. |
| 2008/0165167 | A1 * | 7/2008 | Hong et al. .................... 345/204 |

FOREIGN PATENT DOCUMENTS

| CN | 1049576 A | 2/1991 |
| CN | 1253407 A | 5/2000 |
| CN | 1378193 A | 11/2002 |
| CN | 1522382 A | 8/2004 |
| CN | 1797919 A | 7/2006 |
| JP | 05-236744 | 9/1993 |
| JP | 2002-233139 | 8/2002 |
| JP | 2004-295135 (A) | 10/2004 |
| JP | 2005-315919 | 11/2005 |
| JP | 2006-189714 A | 7/2006 |
| KR | 10-2001-0080960 (A) | 8/2001 |
| KR | 10-2002-0039706 A | 5/2002 |

(Continued)

OTHER PUBLICATIONS

Office Action issued on Aug. 29, 2008 from the Korean Intellectual Property Office in the Korean Patent Application No. 10-2007-0086511.

(Continued)

*Primary Examiner* — Tuyet Thi Vo
(74) *Attorney, Agent, or Firm* — Knobbe, Martens, Olson & Bear, LLP

(57) ABSTRACT

A DC-DC converter and an organic light emitting display comprising: a voltage generator receiving an input voltage through an input terminal to selectively generate a first voltage and a second voltage, outputting the first voltage and the second voltage through first and second output terminals, a capacitor coupled to the output terminal; and a switch unit discharging voltage stored in the capacitor according to the control signal.

20 Claims, 4 Drawing Sheets

(56) References Cited

FOREIGN PATENT DOCUMENTS

| KR | 20020039706 | * | 5/2002 |
|---|---|---|---|
| KR | 20020039706 A | | 5/2002 |
| KR | 10-2005-0032416 A | | 4/2005 |
| KR | 10-2006-0039987 A | | 5/2006 |
| KR | 10-2007-0003812 (A) | | 1/2007 |
| WO | WO 03/005110 | | 1/2003 |

OTHER PUBLICATIONS

Japanese Office Action dated Dec. 7, 2010 from Japanese Patent Application No. JP 2007-275362 claiming priority to Korean Patent Application No. KR 10-2007-0086511 which corresponds to the captioned application.
Chinese Office Action dated Dec. 21, 2010 of Chinese Patent Application No. CN 200810212442.7 claiming priority of Korean Patent Application No. KR 10-2007-0086511 which corresponds to the captioned application.
Chinese Office Action No. 200810212442.7 dated Jun. 21, 2010.
Notice of Allowance from KR 10-2007-0086511 dated Mar. 9, 2009.
Japanese Office Action for Japanese Patent Application No. 2007-275362—3 pages, dated Aug. 17, 2010.
European Search Report dated Dec. 13, 2011 for European Patent Application No. EP 08 163 107.9 which shares priority of Korean Patent Application No. KR 10-2007-0086511 with captioned U.S. Appl. No. 12/217,817.

* cited by examiner

DC-DC CONVERTER AND ORGANIC LIGHT EMITTING DISPLAY USING THE SAME

CROSS-REFERENCE TO RELATED APPLICATION

This application claims priority to and the benefit of Korean Patent Application No. 10-2007-0086511, filed on Aug. 28, 2007, in the Korean Intellectual Property Office, the disclosure of which is incorporated herein by reference.

BACKGROUND

1. Field of the Invention

The present invention relates to a DC-DC converter and an organic light emitting display using the same, and more particular to a DC-DC converter and an organic light emitting display using the same to prevent an abnormal display in the organic light emitting display.

2. Description of the Related Technology

Recently, various flat panel display devices having reduced weight and volume, which are disadvantages of a cathode ray tube, have been developed. Flat panel display devices include a liquid crystal display (LCD), a field emission display (FED), a plasma display panel (PDP), and an organic light emitting display (OLED), etc.

An organic light emitting display among the flat panel display devices displays images using an organic light emitting diode (OLED) generating light by means of the recombination of electrons and holes. The market for such an organic light emitting display has several advantages including excellent color reproduction and thin thickness, etc., has expanded into PDA, MP3, DSC, etc., in addition to cellular phone applications.

FIG. 1 is a circuit view showing a pixel for an organic light emitting display. Referring to FIG. 1, the pixel comprises a first transistor M1, a second transistor M2, a capacitor Cst, and an organic light emitting diode OLED.

The source of the first transistor M1 is coupled to a first power supply ELVDD, the drain thereof is coupled to the organic light emitting diode OLED, and the gate thereof is coupled to a node N1. The source of the second transistor M2 is coupled to a data line Dm, the drain thereof is coupled to the node N1, and the gate thereof is coupled to a scan line Sn. The first electrode of the capacitor Cst is coupled to the first power supply ELVDD and the second electrode thereof is coupled to the node N1. And, the organic light emitting diode OLED comprises an anode electrode, a cathode electrode and a light emitting layer, wherein the anode electrode is coupled to the drain of the first transistor M1 and the cathode electrode is coupled to a second power supply ELVSS. If current flows from the anode electrode of the organic light emitting diode OLED to the cathode electrode thereof, the light emitting layer light emits corresponding to the amount of the flowing current. The equation 1 represents the current flowing into the drain of the first transistor M1.

$$I_d = \frac{\beta}{2}(ELVDD - Vdata - Vth)^2 \qquad \text{[Equation 1]}$$

Herein, $I_d$ represents the current flowing into the drain of the first transistor M1, Vdata represents the voltage of the data signal, ELVDD represents the voltage of the first power supply at the source of the first transistor M1, Vth represents the threshold voltage of the first transistor M1, and β represents a constant.

If the pixel of the organic light emitting display is supplied with the first voltage ELVDD and the second voltage ELVSS even when the data signals is not transferred, a certain voltage is applied to the gate of the first transistor M1 by means of the capacitor Cst. Therefore, current flows into the organic light emitting diode OLED so that the pixel is light emitted. However, this luminescence is unnecessary luminescence so that the lifetime of the pixel is shortened.

SUMMARY OF CERTAIN INVENTIVE ASPECTS

One aspect is a DC-DC converter including a voltage generator configured to receive an input voltage through an input terminal, to generate a first power voltage and a second power voltage, the second power voltage being less than the first power voltage, and to output the first power voltage and second power voltage through first and second output terminals, respectively, where the voltage generator is configured to generate the first and second power voltages according to a received control signal, a capacitor coupled to at least one of the first and second output terminals, and a switch unit configured to discharge the capacitor according to the control signal.

Another aspect is a DC-DC converter including a voltage generator configured to receive an input voltage through an input terminal, to generate a first power voltage and a second power voltage, the second power voltage being less than the first power voltage, and to output the first power voltage and the second power voltage through first and second output terminals, where the first and second power voltages are selectively generated based on a control signal, a capacitor coupled to at least one of the first and second output terminals, and a resistor coupled to at least one of the first and second output terminals, and a ground and configured to discharge the voltage stored in the capacitor.

Another aspect is an organic light emitting display including a pixel unit configured to display images based on received data signals, scan signals, and first and second power voltages, a data driver configured to generate the data signals, a scan driver configured to generate the scan signals, and a DC-DC converter configured to generate the first and second power voltages, where the DC-DC converter includes a voltage generator configured to receive an input voltage through an input terminal, to generate the first power voltage and the second power voltage, the second power voltage being less than the first power voltage, and to output the first power voltage and the second power voltage through first and second output terminals, where the first and second power voltages are selectively generated based on a control signal, a capacitor coupled to at least one of the first and second output terminals, and a switch unit configured to discharge the voltage stored in the capacitor according to the control signal.

Another aspect is an organic light emitting display including a pixel unit configured to display images based on received data signals, scan signals, and first and second power voltages, a data driver configured to generate the data signals, a scan driver configured to generate the scan signals, and a DC-DC converter configured to generate the first power voltage and the second power voltage, where the DC-DC converter includes a voltage generator configured to receive an input voltage through an input terminal, to generate a first power voltage and a second power voltage, the second power voltage being less than the first power voltage, and to output the first power voltage and the second power voltage through first and second output terminals, where the first and second power voltages are selectively generated based on a control signal, a capacitor coupled to at least one of the first and second output terminals, and a resistor coupled to at least one of the first and second output terminals, and a ground and configured to discharge the voltage stored in the capacitor.

BRIEF DESCRIPTION OF THE DRAWINGS

These and/or other aspects and features of the invention will become apparent and more readily appreciated from the following description of certain embodiments, taken in conjunction with the accompanying drawings of which.

DETAILED DESCRIPTION OF CERTAIN INVENTIVE EMBODIMENTS

Figure 1:
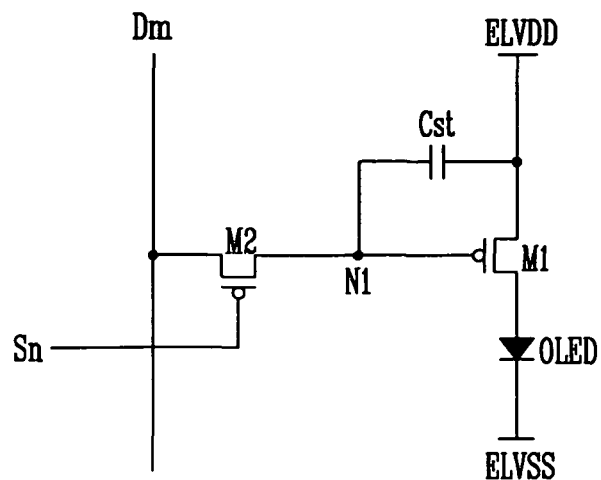
FIG. 1 is a circuit view showing a pixel for an organic light emitting display.

Hereinafter, certain embodiments according to the present invention will be described with reference to the accompanying drawings. Here, when a first element is described as being coupled to a second element, the first element may be not only directly coupled to the second element but may also be indirectly coupled to the second element via a third element. Furthermore, elements that are not essential to the complete understanding of the prevention may be omitted for clarity. Also, like reference numerals generally refer to like elements throughout.

Hereinafter, certain embodiments according to the present invention will be described with reference to the accompanying drawings.

Figure 2:
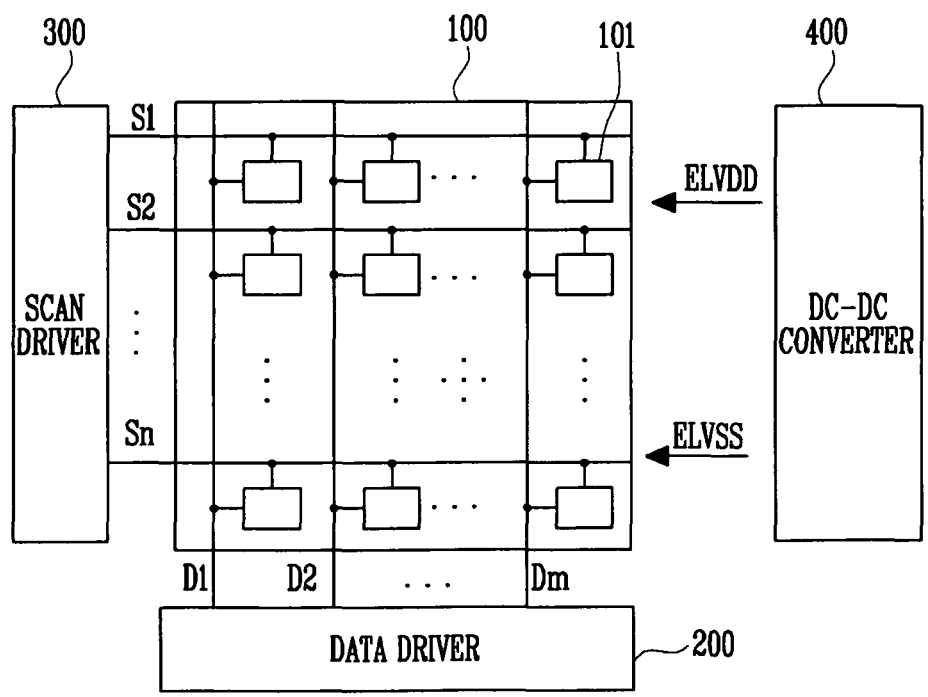
FIG. 2 is a schematic view showing a structure of an organic light emitting display.

FIG. 2 is a schematic view showing an organic light emitting display. Referring to FIG. 2, an organic light emitting display device comprises a pixel unit 100, a data driver 200, a scan driver 300, and a DC-DC converter 400.

The pixel unit 100 is arranged with a plurality of pixels 101, the respective pixels 101 comprising organic light emitting diodes (not shown) configured to emit light corresponding to the flow of current therethrough. The pixel units are arranged with n scan lines S1, S2, . . . , Sn−1, Sn formed in a row direction configured to transmit scan signals and m data lines D1, D2, . . . , Dm−1, Dm formed in a column direction configured to transmit data signals. Also, the pixel unit 100 is operated by receiving first voltage ELVDD and second voltage ELVSS. Therefore, the pixel 100 displays images by light illuminating the organic light emitting diodes by means of the scan signals, the data signals, the first voltage ELVDD and the second voltage ELVSS.

The data driver 200 is a means for applying the data signals to the pixel unit 100 and receives video data with red, blue, and green components to generate the data signals. The data driver 200 is coupled to the data lines D1, D2, . . . , Dm−1, Dm of the pixel unit 100 to apply the generated data signals to the pixel unit 100.

The scan driver 300 is a means for applying the scan signals to the pixel unit 100 and is coupled to the scan lines S1, S2, . . . , Sn−1, Sn to transmit the scan signals to the particular rows of the pixel unit 100. The pixels 101, which receive the scan signals, also receive the data signals output from the data driver 200 to generate driving current from the pixels 101 so that the driving current flows into the organic light emitting diodes of the pixels 101.

The DC-DC converter 400 is a means for transferring the first voltage ELVDD and the second ELVSS to the pixel unit 100. DC-DC converter 400 converts a received voltage to generate the first voltage ELVDD and the second voltage ELVSS for the pixel unit 100. The DC-DC converter is formed using a regulator and comprises a boost circuit for generating the first voltage ELVDD and an inverter circuit for generating the second voltage ELVSS.

Figure 3:
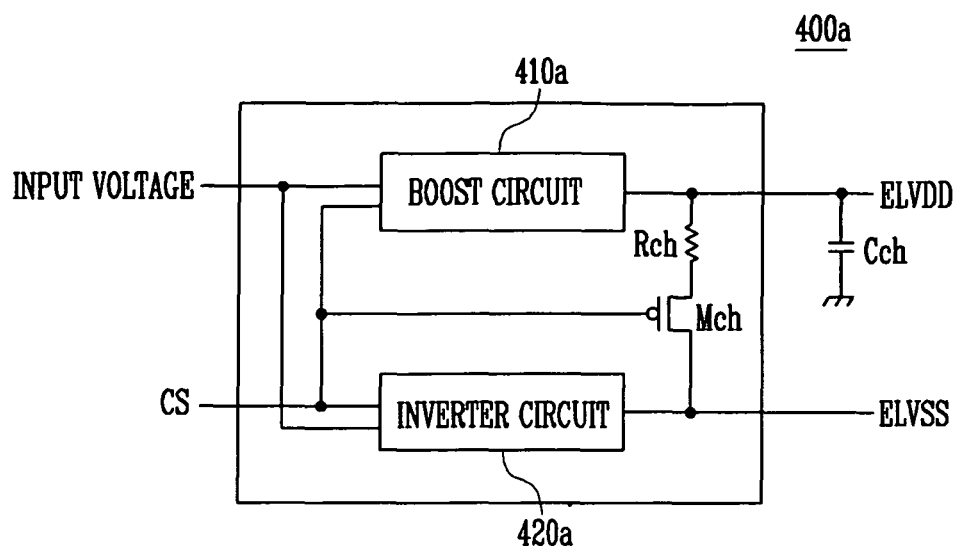
FIG. 3 is a schematic view showing a first embodiment of a DC-DC converter.

FIG. 3 is a schematic view showing an embodiment of a DC-DC converter. Referring to FIG. 3, the DC-DC converter 400a comprises a boost circuit 410a, an inverter circuit 420a, a capacitor Cch, and a switch unit comprising Rch and Mch.

The boost circuit 410a is a means for receiving an input voltage and is configured to boost the input voltage to generate the first voltage ELVDD. The input voltage may, for example, be from a battery for a mobile phone, etc.

The inverter circuit 420a is a means for receiving the input voltage and is configured to invert the input voltage to generate the second voltage ELVSS with low voltage.

In addition, the boost circuit 410a and the inverter circuit 420a receive a control signal CS controlling whether they are operated.

The capacitor Cch is coupled to an output terminal outputting the first voltage ELVDD of the DC-DC converter 400a, making it possible to stably output the output of the DC-DC converter 400a.

In this embodiment, the switch unit with Rch and Mch is positioned inside the DC-DC converter 400a and coupled to the capacitor Cch and is configured to discharge or maintain voltage charged in the capacitor Cch according to the control signal CS.

The boost circuit 410a is stopped by means of the control signal CS, and the capacitor Cch is charged with the voltage of the first power supply ELVDD. Therefore, the voltage of the first power supply ELVDD is transferred to the pixel unit shown in FIG. 2 by means of the charged voltage so that the respective pixels of the pixel unit receive the first voltage ELVDD. Unwanted luminescence of the pixels occurs when the operation of the boost circuit 410a is stopped, shortening the lifetime of the pixels.

Therefore, in order to prevent this unwanted luminescence, the switch unit with Rch and Mch is coupled to the capacitor Cch to produce a path discharging the voltage stored in the capacitor Cch.

The switch unit comprises the resistor Rch and the transistor Mch. In this embodiment, one terminal of the resistor Rch is coupled to the output terminal of the boost circuit 410a and other terminal is coupled to the source of the transistor Mch. The source of the transistor Mch is coupled to the resistor Rch, the drain thereof is coupled to the output terminal outputting the second voltage ELVSS generated from the inverter circuit 420a, and the gate thereof receives the control signal CS operating the DC-DC converter 400a to perform a switching operation. In some embodiments, the resistor Rch may be connected to the second voltage ELVSS and the transistor Mch may be connected to the output terminal of the boost circuit 410a.

When the DC-DC converter 400a is operated by means of the control signal CS, the transistor Mch is in an off state and when the operation of the DC-DC converter 400a is stopped, the transistor Mch is in an on state. Therefore, when the transistor Mch is in the on state, the one terminal of the resistor Rch is transferred with the second voltage ELVSS to flow the voltage stored in the capacitor Cch into the second power supply ELVSS through the resistor Rch so that the charge stored in the capacitor Cch is conducted through the resistor Rch. And, when the transistor Mch is in the off state, the current does not flow into the resistor Rch so that it has substantially no effect on the voltage of the output terminal of the boost circuit 410a.

Therefore, when the DC-DC converter 400a is in the off state, the voltage charged in the capacitor Cch is discharged. As a result, when the DC-DC converter 400a is in the off state, the switch unit prevents the first voltage ELVDD from being transmitted to the pixel unit of FIG. 2, making it possible to prevent the respective pixels of the pixel unit from emitting light.

Figure 4:
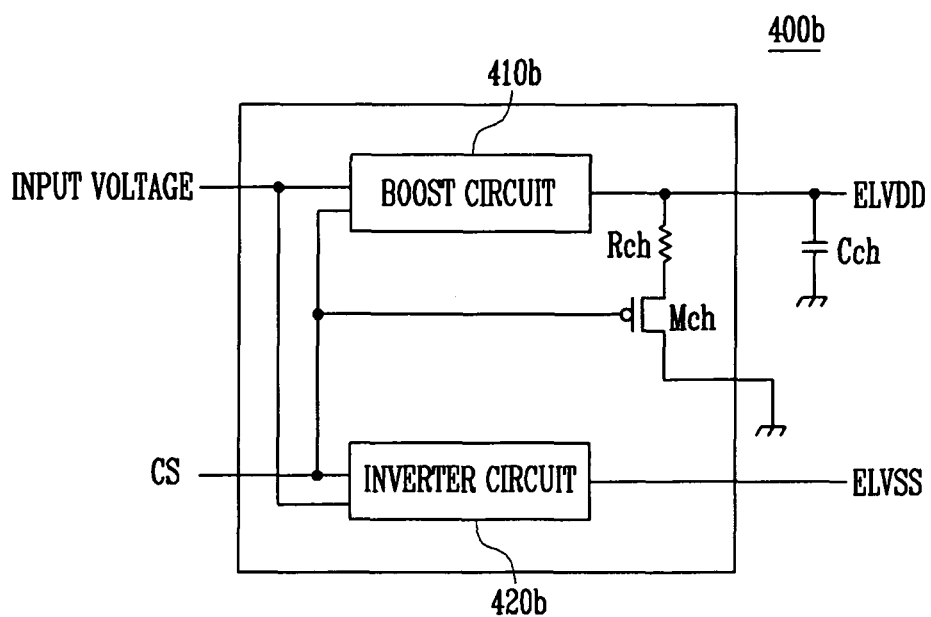
FIG. 4 is a schematic view showing a second embodiment of a DC-DC converter.

FIG. 4 is a schematic view showing another embodiment of a DC-DC converter. Referring to FIG. 4, a DC-DC converter 400b comprises a boost circuit 410b, an inverter circuit 420b, a capacitor Cch, and a switch unit Rch and Mch.

Unlike the DC-DC converter 400a shown in FIG. 3, in the DC-DC converter 400b shown in FIG. 4, one terminal of the transistor Mch of the switch unit Rch and Mch is not coupled to the output terminal of the inverter 420b but is coupled to the ground. Therefore, when the boost circuit 410b is stopped according to the control signal CS, the charge stored in the capacitor Cch flows into the ground through the transistor Mch.

Therefore, when the DC-DC converter 400b is in an off state, the voltage charged in the capacitor Cch is discharged. As a result, when the DC-DC converter 400b is in the off-state, the switch unit prevents the first voltage ELVDD from being transferred to the pixel unit of FIG. 2 during predetermined time, making it possible to prevent the respective pixels of the pixel unit from emitting light.

Figure 5:
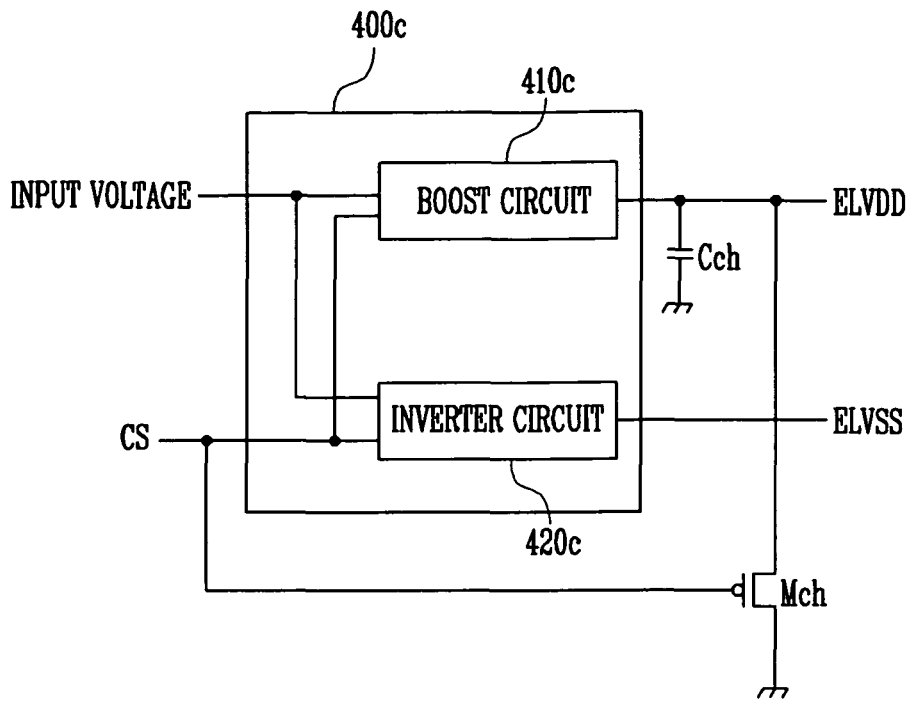
FIG. 5 is a schematic view showing a third embodiment of a DC-DC converter.

FIG. 5 is a schematic view showing another embodiment of a DC-DC converter. Referring to FIG. 5, a DC-DC converter 400c comprises a boost circuit 410c and an inverter circuit 420c and the output terminal of the DC-DC converter 400c is coupled to a capacitor Cch and a switch unit Mch.

The difference between the DC-DC converter 400c shown in FIG. 5 and the DC-DC converter 400a shown in FIG. 3 is that the transistor Mch is coupled to the output signal outside of the DC-DC converter 400c.

The source of the transistor Mch is coupled to the output terminal of the first power supply ELVDD and the drain thereof is coupled to the ground.

Therefore, when the boost circuit 410c is stopped corresponding to the control signal CS, the voltage stored in the capacitor Cch flows into the ground through the transistor Mch.

Accordingly, when the DC-DC converter 400c is in the off-state, the voltage charged in the capacitor Cch is discharged. As a result, when the DC-DC converter 400c is in the off-state, the transistor Mch prevents the first voltage ELVDD from being transferred to the pixel unit of FIG. 2, making it possible to prevent the respective pixels of the pixel unit from emitting light.

Figure 6:
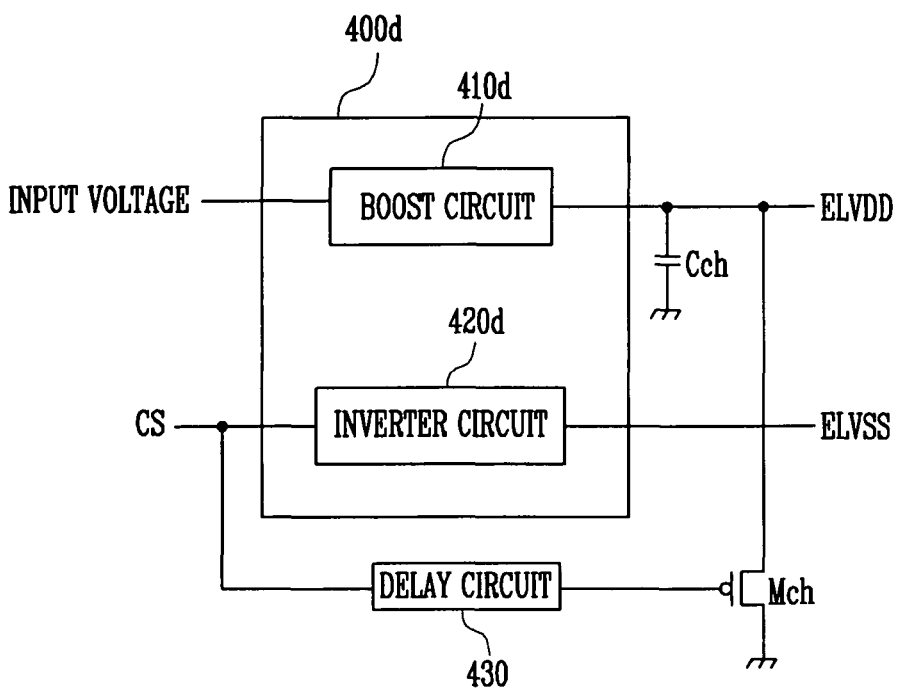
FIG. 6 is a schematic view showing a fourth embodiment of a DC-DC converter.

FIG. 6 is a schematic view showing another embodiment of a DC-DC converter. Referring to FIG. 6, a DC-DC converter 400d comprises a boost circuit 410d and an inverter circuit 420d and the output terminal of the DC-DC converter 400d is coupled to a capacitor Cch and a switch unit and a delay circuit 430 is coupled between the input terminal of the control signal CS and the switch unit.

The boost circuit 410d is a means for boosting the input voltage to generate the first voltage ELVDD. The input voltage may, for example, be transferred from a battery for a mobile phone, etc.

The inverter circuit 420d is a means for inverting the input voltage to generate the second voltage ELVSS.

The boost circuit 410d and the inverter circuit 420d receive a control signal CS to determine whether they are operated.

The capacitor Cch is coupled to the output terminal of the DC-DC converter 400d, making it possible to stably output the output of the DC-DC converter 400d.

The switch unit is formed outside the DC-DC converter 400d and discharges voltage charged in the capacitor Cch. When the voltage charged in the capacitor Cch is not discharged and the DC-DC converter 400d is stopped during its operation, the capacitor Cch is charged with the voltage of the first power supply ELVDD. Therefore, the voltage of the first power supply ELVDD is transmitted to the pixel unit shown in FIG. 2 by means of the charged voltage in the capacitor Cch so that the respective pixels of the pixel unit receive the first voltage ELVDD and can emit unwanted light. The luminescence of the pixels shortens the lifetime of the pixels. Therefore, in order to prevent this luminescence, a path for discharging the voltage stored in the capacitor Cch from the switch unit is produced. The switch unit comprises the transistor Mch. The source of the transistor Mch is coupled to the output terminal of the boost circuit 410d, the drain thereof is coupled to the ground, and the gate thereof receives the control signal CS operating the DC-DC converter 400d to perform the switching operation. In other words, when the DC-DC converter 400d is operated by means of the control signal CS, the transistor Mch is in an off state and when the operation of the DC-DC converter 400d is stopped, the transistor Mch is in an on state. When the transistor Mch is in the on state, the charge stored in the capacitor Cch flows into the ground through the transistor Mch to discharge the voltage stored in the capacitor Cch. And, when the transistor Mch is in the off state, the current does not flow so that it has substantially no effect on the voltage of the output terminal of the boost circuit 410d.

In other words, when the DC-DC converter 400d is in the off state, the voltage charged in the capacitor Cch is discharged. As a result, when the DC-DC converter 400c is in the off state, the switch unit prevents the first voltage ELVDD from being transmitted to the pixel unit of FIG. 2, making it possible to prevent the respective pixels of the pixel unit from emitting light.

The delay circuit 430 is a means for delaying the application of the control signal CS to the transistor Mch. The delay circuit 430 turns the transistor Mch on with a delay after the DC-DC converter 400d is stopped. Therefore, the charge in the capacitor Cch does not flow into the ground through the transistor Mch immediately after the operation of the DC-DC converter 400d is stopped but flows into the ground through the transistor Mch after a delay, so that the first power supply ELVDD is not immediately interrupted.

Figure 7:
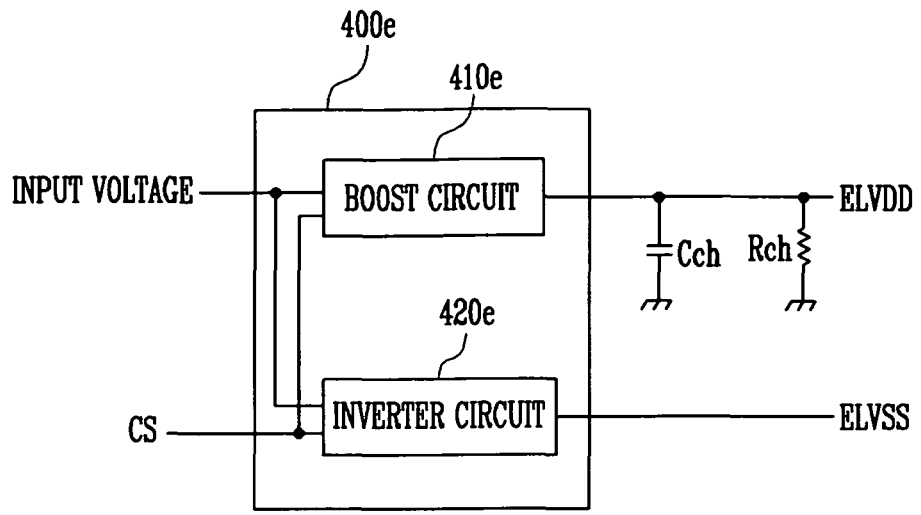
FIG. 7 is a schematic view showing a fifth embodiment of a DC-DC converter.

FIG. 7 is a structure view showing another embodiment of a DC-DC converter. Referring to FIG. 7, a DC-DC converter 400e comprises a boost circuit 410e and an inverter circuit 420e and the output terminal of the DC-DC converter 400e is coupled to a capacitor Cch and a resistor Rch.

The boost circuit 410e is a means for boosting an input voltage to generate the first voltage ELVDD. The input voltage may, for example, be transferred from a battery for a mobile phone, etc.

The inverter circuit 420e is a means for inverting the input voltage to generate the second voltage ELVSS.

The boost circuit 410e and the inverter circuit 420e receive a control signal CS to determine whether they are operated.

The capacitor Cch is coupled to the output terminal of the DC-DC converter 400e, making it possible to stably output the output of the DC-DC converter 400e.

In this embodiment, the resistor Rch is formed outside the DC-DC converter 400e and discharges charge in the capacitor Cch. When the voltage charged in the capacitor Cch is not discharged and the DC-DC converter 400e is stopped during its operation, the capacitor Cch is charged with the voltage of the first power supply ELVDD. Therefore, the voltage of the first power supply ELVDD is transmitted to the pixel unit shown in FIG. 2 through the boost circuit 410e so that the respective pixels of the pixel unit receive the first voltage ELVDD and can emit light. The luminescence of the pixels occurs in a state where the operation of the DC-DC converter 400e is stopped, having a bad effect on the lifetime of the pixels, etc. Therefore, in order to prevent this luminescence, a path discharging the capacitor Cch through the resistor Rch is produced. The one terminal of the resistor Rch is coupled to the output terminal of the DC-DC converter 400e and the other terminal thereof is coupled to the ground. Accordingly, the voltage charged in the capacitor Cch is dissipated through the resistor Rch. Since the time of discharging the voltage charged in the capacitor Cch corresponds to the size of the capacitor Cch and the size of the resistor Rch, the sizes of the capacitor Cch and the resistor Rch are controlled, preventing the voltage charged in the capacitor Cch from discharging too fast or too slow.

Because the voltage stored at the output terminal of the DC-DC converter 400e is discharged after the DC-DC converter 400e is in the off state, the voltage of the first power supply ELVDD is prevented from being transmitted to the pixel unit of FIG. 2, making it possible to prevent the respective pixels of the pixel unit from emitting light.

Figure 8:
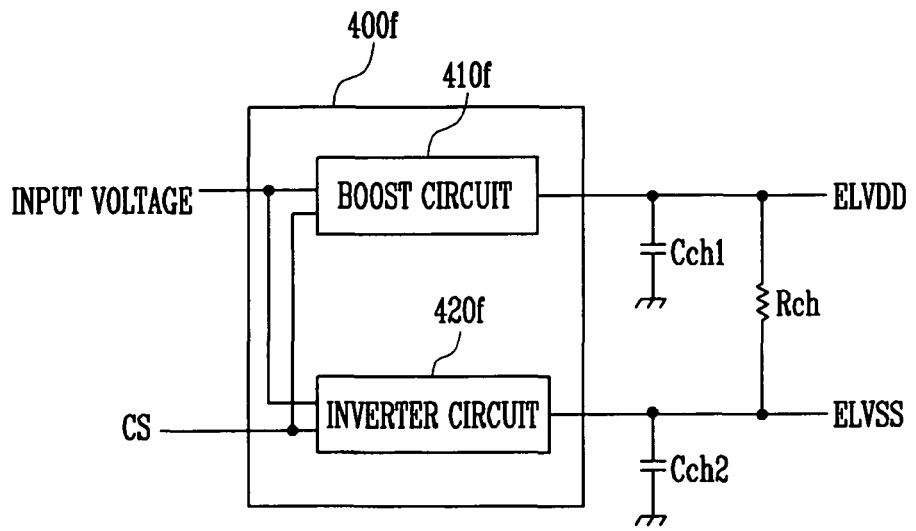
FIG. 8 is a schematic view showing a sixth embodiment of a DC-DC converter.

FIG. 8 is a structure view showing another embodiment of a DC-DC converter. Referring to FIG. 8, the DC-DC converter 400f comprises a boost circuit 410f and an inverter circuit 420f and the output terminal of the DC-DC converter 400f is coupled to capacitors Cch1 and Cch2 and a resistor Rch.

The boost circuit 410f is a means for boosting an input voltage to generate the first voltage ELVDD. The input voltage may, for example, be transmitted from a battery for a mobile phone, etc.

The inverter circuit 420f is a means for inverting the input voltage to generate the second voltage ELVSS.

The boost circuit 410f and the inverter circuit 420f receive a control signal CS to determine whether they are operated.

The capacitors Cch1 and Cch2 are coupled to the output terminals of the boost circuit 410f and the inverter circuit 420f, respectively, making it possible to stably output the voltage of the first power supply ELVDD and the voltage of the second power supply ELVSS.

The resistor Rch is formed outside the DC-DC converter 400f and discharges voltage charged in the capacitors Cch1 and Cch2. When the voltages charged in the capacitors Cch1 and Cch2 are not discharged and the DC-DC converter 400f is stopped during its operation, the capacitors Cch1 and Cch2 are charged with the voltage of the first power supply ELVDD and the second power supply ELVSS, respectively. Therefore, the voltage of the first power supply ELVDD and the second power supply ELVSS are transferred to the pixel unit shown in FIG. 2 so that the respective pixels of the pixel unit can emit light. The luminescence of the pixels occurs in a state where the operation of the DC-DC converter 400f is stopped, having a bad effect on the lifetime of the pixels, etc. Therefore, in order to prevent this luminescence, a path discharging the voltage stored in the capacitors Cch1 and Cch2 through the resistor Rch is produced. The one terminal of the resistor Rch is coupled to the output terminal of the boost circuit 410f and the other terminal thereof is coupled to the output terminal of the inverter circuit 420f. Accordingly, the resistor Rch is positioned between the voltage of the first power supply ELVDD and the voltage of the second power supply ELVSS to discharge the capacitors Cch1 and Cch2. Since the time discharging the voltages charged in the capacitors Cch1 and Cch2 corresponds to the sizes of the capacitors Cch1 and Cch2 and the size of the resistor Rch, the sizes of the capacitors Cch1 and Cch2 and the resistor Rch are controlled, preventing the voltages charged in the capacitors Cch1 and Cch2 from being discharged too fast or too slow.

Because the voltage stored in the output terminal of the DC-DC converter 400f is discharged after the DC-DC converter 400f is in the off state, the voltage stored in the output terminals of the DC-DC converter 400f are prevented from being transmitted to the pixel unit of FIG. 2, making it possible to prevent the respective pixels of the pixel unit from emitting light.

With the DC-DC converter and the organic light emitting display using the same according to the present invention, the harmful luminescence phenomenon caused due to the application of the first voltage ELVDD and the second voltage ELVSS to the pixels when the DC-DC converter is turned-off can be prevented.

Although certain embodiments of the present invention have been shown and described, it would be appreciated by those skilled in the art that changes might be made in this embodiment without departing from the principles and spirit of the invention.

What is claimed is:

1. A DC-DC converter, comprising:
    a control signal input terminal, configured to receive a control signal from an external source;
    a voltage generator configured to receive an input voltage through an input terminal, to generate a first power voltage and a second power voltage, the second power voltage being less than the first power voltage, and to output the first power voltage and second power voltage through first and second output terminals, respectively, wherein the voltage generator is configured to output the first and second power voltages according to the received control signal, wherein the voltage generator comprises:
        a first circuit, configured to receive the input voltage and to generate the first power voltage according to the received input voltage, and
        a second circuit, configured to receive the input voltage and to generate the second power voltage according to the received input voltage;
    a capacitor coupled to at least one of the first and second output terminals; and
    a switch unit configured to receive the control signal and to discharge the capacitor according to the control signal.

2. The DC-DC converter as claimed in claim 1, wherein:
    the first circuit comprises a boost circuit configured to generate the first power voltage; and the second circuit comprises an inverter circuit configured to generate the second power voltage.

3. The DC-DC converter as claimed in claim 1, wherein the switch unit further comprises a transistor configured to be turned on and off by the control signal.

4. The DC-DC converter as claimed in claim 3, further comprising a resistor selectively connected to the capacitor by the transistor and configured to discharge the capacitor.

5. The DC-DC converter as claimed in claim 3, further comprising a delay circuit configured to receive the control signal and to transmit the control signal to the gate of the transistor after a delay.

6. The DC-DC converter as claimed in claim 3, wherein the transistor is coupled to a ground.

7. The DC-DC converter as claimed in claim 3, wherein the transistor is coupled to the second power supply.

8. A DC-DC converter comprising:
a control signal input terminal, configured to receive a control signal from an external source;
a voltage generator configured to receive an input voltage through an input terminal, to generate a first power voltage and a second power voltage, the second power voltage being less than the first power voltage, and to output the first power voltage and the second power voltage through first and second output terminals, wherein the first and second power voltages are selectively output based on the control signal, wherein the voltage generator comprises:
a first circuit, configured to receive the input voltage and to generate the first power voltage according to the received input voltage, and
a second circuit, configured to receive the input voltage and to generate the second power voltage according to the received input voltage;
a capacitor coupled to at least one of the first and second output terminals;
a resistor on an electrical path selectively connecting at least one of the first and second output terminals and a ground, wherein the resistor is configured to discharge the voltage stored in the capacitor; and
a switch unit configured to receive the control signal and to selectively connect the at least one of the first and second output terminals and the ground according to the control signal.

9. The DC-DC converter as claimed in claim 8, further comprising a second capacitor coupled to the other of the first and second output terminals.

10. The DC-DC converter as claimed in claim 8, wherein the resistor is selectively coupled to both of the first and second output terminals.

11. An organic light emitting display comprising:
a pixel unit configured to display images based on received data signals, scan signals, and first and second power voltages;
a data driver configured to generate the data signals;
a scan driver configured to generate the scan signals; and
a DC-DC converter configured to generate the first and second power voltages,
wherein the DC-DC converter comprises:
a control signal input terminal, configured to receive a control signal from an external source;
a voltage generator configured to receive an input voltage through an input terminal, to generate the first power voltage and the second power voltage, the second power voltage being less than the first power voltage, and to output the first power voltage and the second power voltage through first and second output terminals, wherein the first and second power voltages are selectively output based on the control signal, wherein the voltage generator comprises:
a first circuit, configured to receive the input voltage and to generate the first power voltage according to the received input voltage,
a second circuit, configured to receive the input voltage and to generate the second power voltage according to the received input voltage;
a capacitor coupled to at least one of the first and second output terminals; and
a switch unit configured to receive the control signal and to discharge the voltage stored in the capacitor according to the control signal.

12. The organic light emitting display as claimed in claim 11, wherein:
the first circuit comprises a boost circuit configured to generate the first power voltage; and
the second circuit comprises an inverter circuit generating the second power voltage.

13. The organic light emitting display as claimed in claim 11, wherein the switch unit further comprises a transistor is configured to be turned on and turned off according to the control signal.

14. The organic light emitting display as claimed in claim 13, further comprising a resistor selectively connected to the capacitor by the transistor and configured to discharge the capacitor.

15. The organic light emitting display as claimed in claim 13, further comprising a delay circuit configured to receive the control signal and to transfer it to the gate of the transistor after a delay.

16. The organic light emitting display as claimed in claim 13, wherein the transistor is coupled to a ground.

17. The organic light emitting display as claimed in claim 13, wherein the transistor is coupled to the second power voltage.

18. An organic light emitting display comprising:
a pixel unit configured to display images based on received data signals, scan signals, and first and second power voltages;
a data driver configured to generate the data signals;
a scan driver configured to generate the scan signals; and
a DC-DC converter configured to generate the first power voltage and the second power voltage,
wherein the DC-DC converter comprises:
a control signal input terminal, configured to receive a control signal from an external source;
a voltage generator configured to receive an input voltage through an input terminal, to generate a first power voltage and a second power voltage, the second power voltage being less than the first power voltage, and to output the first power voltage and the second power voltage through first and second output terminals, wherein the first and second power voltages are selectively output based on the control signal, wherein the voltage generator comprises:
a first circuit, configured to receive the input voltage and to generate the first power voltage according to the received input voltage, and
a second circuit, configured to receive the input voltage and to generate the second power voltage according to the received input voltage;
a capacitor coupled to at least one of the first and second output terminals;
a resistor on an electrical path selectively connecting at least one of the first and second output terminals and a ground, wherein the resistor is configured to discharge the voltage stored in the capacitor; and a switch unit configured to receive the control signal and to selectively connect the at least one of the first and second output terminals and the ground according to the control signal.

19. The display as claimed in claim 18, wherein the DC-DC converter further comprises a second capacitor coupled to the other of the first and second output terminals.

20. The display as claimed in claim 18, the resistor is coupled to both of the first and second output terminals.

* * * * *